J. G. & G. R. INSHAW.
PLANETARY GEARING FOR ROLLING MACHINES.
APPLICATION FILED NOV. 14, 1916.
1,247,536.
Patented Nov. 20, 1917.
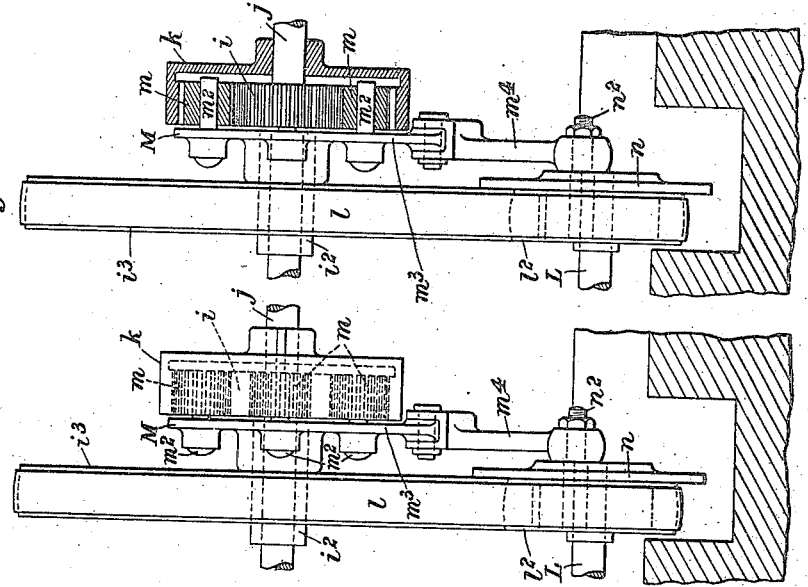
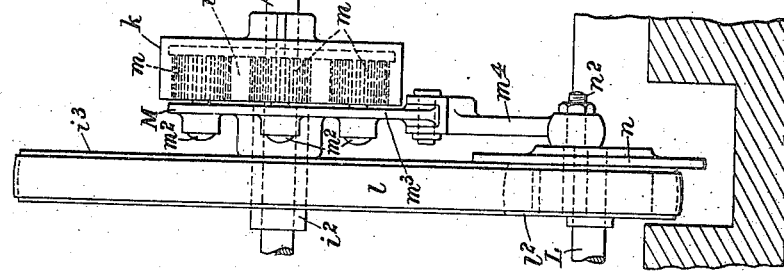
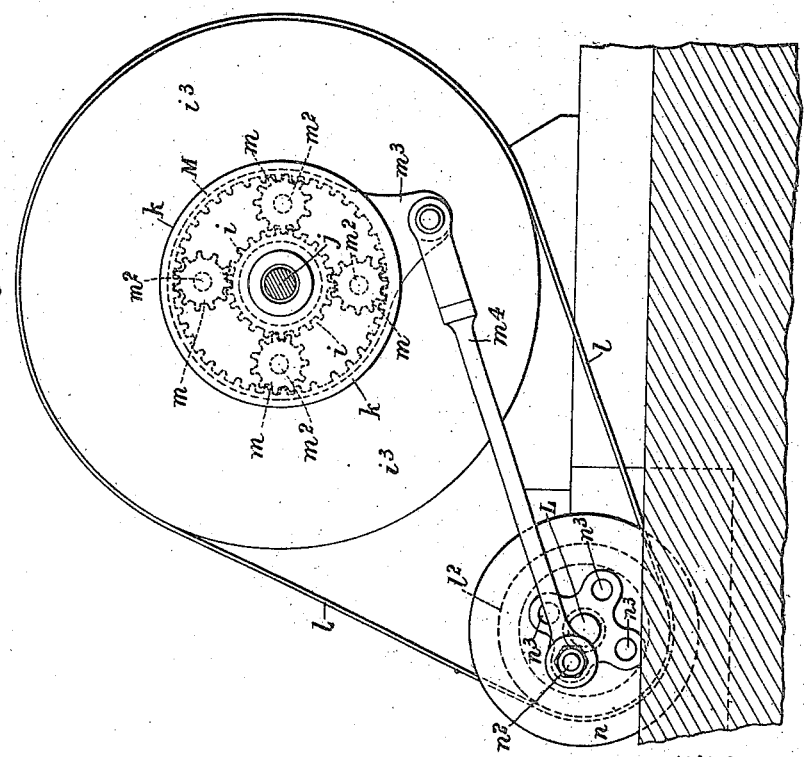
INVENTORS
JOHN GEORGE INSHAW
GEORGE RICHARD INSHAW
BY
ATTORNEYS

UNITED STATES PATENT OFFICE.

JOHN GEORGE INSHAW AND GEORGE RICHARD INSHAW, OF GARTCOSH, SCOTLAND.

PLANETARY GEARING FOR ROLLING-MACHINES.

1,247,536.     Specification of Letters Patent.     Patented Nov. 20, 1917.

Application filed November 14, 1916. Serial No. 131,353.

*To all whom it may concern:*

Be it known that we, JOHN GEORGE INSHAW and GEORGE RICHARD INSHAW, both subjects of the King of Great Britain, residing at Lochwood House, near Gartcosh, in the county of Lanark, Scotland, have invented new and useful Improvements in Planetary Gearing for Rolling-Machines, of which the following is a specification.

This invention relates to machines for pilgering hollow blooms, billets, or the like, in making weldless, or seamless tubes by means of hydraulic apparatus and consists in the application to such machines of the class of apparatus by means of which continuous rotary motion is, by means of sun and planetary gear, caused to impart intermittent rotary motions of partial rotation to the mandrel carrier of the machine and consequently to the work carried by the mandrel, our invention providing means by which the said sun and planetary gear is driven, such that it will withstand the strains put upon it by the pilgering operations.

We will describe our invention with reference to the accompanying drawings in which Figure 1 is a side elevation of mechanism and means for driving it in accordance with this invention. Figs. 2 and 3 being elevations at right angles to Fig. 1; (Fig. 3 being partly in section).

It is to be understood that the mechanism is applied to a pilgering machine, the motions of intermittent rotation being conveyed from the said machine from the shaft L, to the shaft $j$, (carrying the mandrel supporting the work) by gear, in accordance with our invention.

The mechanism by which movements of partial rotation are intermittently given to the mandrel and the work carried upon it is as follows:

The sun-wheel $i$, is fixed to a hollow shaft $i^2$, mounted on the rear part of the shaft $j$. The said sun-wheel $i$, is driven from the driving shaft L, by means of a belt $l$ passing over pulleys $i^3$, and $i^2$, keyed respectively to the shafts $i^2$ and L. Planet pinions $m$, (of which four are shown), are freely mounted upon pins $m^2$, projecting laterally from a disk M, (constituting the carrier) and engage with the sun-wheel $i$, and with an internally toothed wheel $k$, keyed to the rear part of the shaft $j$. The boss of the carrier M, is mounted loosely on the shaft $i^2$, and the carrier has an arm $m^3$, connected by a rod $m^4$, to a crank pin $n^2$, of a crank disk $n$, keyed to the shaft L, so that, as the said shaft L, rotates, the carrier M, with its planet pinions $m$, is oscillated upon the shaft $i^2$. When the carrier M, is oscillated in the reverse direction to the direction of rotation of the sun-wheel $i$, the said sun-wheel gives a purchase to the planetary pinions $m$, so that they impart a turning movement to the internally toothed wheel $k$, and shaft $j$. When the carrier M, is ocillated in the opposite direction the planetary pinions $m$, rotate idly and the internally toothed wheel $k$, and shaft $j$, are not operated.

In order to prevent the breakage of parts under any excessive strain which may arise, the belt $l$, can be arranged to slip slightly under such strain.

The oscillations of the carrier M, can be varied in extent by fitting the crank pin $n^2$, into one, or other, of the crank pin holes $n^3$, of which for example four are shown at different distances from the center of the crank-disk $n$.

We claim:

In a pilgering mill, a mandrel shaft an internally-toothed wheel secured thereto, a pulley free on said shaft, a sun wheel carried by said pulley; a coaxial, freely mounted carrier; planetary gear mounted on said carrier and engaging both said sun-wheel and internally toothed wheel; a shaft and means for constantly driving the same during the operation of the pilgering machine; a pulley and crank carried by said constantly driven shaft; a band passing over said pulley and the pulley which carries the sun-wheel, and a rod connecting the crank to the planetary gear carrier, all substantially as hereinbefore described.

In testimony whereof we have signed our names to this specification in the presence of two subscribing witnesses.

JOHN GEORGE INSHAW.
    GEORGE RICHARD INSHAW.

Witnesses:
    M. THOMLINSON,
    JOHN N. McCANN, Jr.

Copies of this patent may be obtained for five cents each, by addressing the "Commissioner of Patents, Washington, D. C."